(12) United States Patent
Botella et al.

(10) Patent No.: US 10,982,771 B2
(45) Date of Patent: Apr. 20, 2021

(54) VALVE FOR EXHAUST LINE

(71) Applicant: FAURECIA SYSTEMES D'ECHAPPEMENT, Nanterre (FR)

(72) Inventors: Ronan Botella, Chevremont (FR);
Julien Cambillard, Belfort (FR);
Raphaël De Matos, Saone (FR); Alen Halepovic, Sainte Suzanne (FR); Gaël Guerlesquin, Fontainemelon (CH)

(73) Assignee: FAURECIA SYSTEMES D'ECHAPPEMENT

( * ) Notice: Subject to any disclaimer, the term of this patent is extended or adjusted under 35 U.S.C. 154(b) by 0 days.

(21) Appl. No.: 16/386,370

(22) Filed: Apr. 17, 2019

(65) Prior Publication Data
US 2019/0323611 A1    Oct. 24, 2019

(30) Foreign Application Priority Data

Apr. 24, 2018 (FR) ...................... 18 53586

(51) Int. Cl.
*F16K 1/22* (2006.01)
*F16K 31/04* (2006.01)
(Continued)

(52) U.S. Cl.
CPC .............. *F16K 1/221* (2013.01); *F01N 1/165* (2013.01); *F16K 1/224* (2013.01)

(58) Field of Classification Search
CPC ........ F16K 1/221; F16K 1/224; F16K 31/041; F16K 1/2268; F16K 1/225; F16K 27/0218; F01N 1/165; F01N 1/166; F01N 1/18; F02D 9/04; F02D 9/106; F02D 9/104; F02M 26/70; F02M 26/66
See application file for complete search history.

(56) References Cited

U.S. PATENT DOCUMENTS 4,022,424 A * 5/1977 Davis et al.
2006/0059902 A1 * 3/2006 Gerards et al.
(Continued)

FOREIGN PATENT DOCUMENTS

DE          10101983 A1      7/2002
DE      102016107265      * 10/2017
(Continued)

OTHER PUBLICATIONS

French Search Report for French Application No. 1853586 dated Jan. 11, 2019.

*Primary Examiner* — Marina A Tietjen
(74) *Attorney, Agent, or Firm* — Carlson, Gaskey & Olds, P.C.

(57) ABSTRACT

A valve comprises a valve body delimiting a passage for exhaust gases, a flap arranged in the valve body, and a drive shaft configured to drive the flap, and which is integrally secured to the flap. At least one guide bearing is configured to guide the drive shaft of the flap in rotation in relation to the valve body, and is connected to the valve body. The valve also includes an actuator and a transmission comprising an adapter rigidly attached directly to the drive shaft of the flap. The transmission is arranged in order to transmit a motor torque between the actuator and the adapter. The adapter has a contact surface that is in sealed contact with a complementary surface provided on the guide bearing.

18 Claims, 3 Drawing Sheets

(51) Int. Cl.
*F02D 9/10* (2006.01)
*F02D 9/04* (2006.01)
*F01N 1/16* (2006.01)

(56) References Cited

U.S. PATENT DOCUMENTS

| | | | |
|---|---|---|---|
| 2006/0059903 A1* | 3/2006 | Gerards et al. | |
| 2007/0131889 A1* | 6/2007 | Unbehaun et al. | |
| 2008/0168767 A1* | 7/2008 | Kanzawa | F01N 13/04 60/324 |
| 2012/0007008 A1* | 1/2012 | Hegner | F02D 9/106 251/305 |
| 2014/0252259 A1* | 9/2014 | Yokoyama | F16C 23/041 251/305 |
| 2015/0083956 A1* | 3/2015 | Gerards | F02D 9/106 251/308 |
| 2015/0300268 A1* | 10/2015 | Evers | F16K 1/226 60/324 |
| 2015/0315984 A1* | 11/2015 | Hemsing | F02D 9/106 123/190.14 |
| 2016/0003198 A1 | 1/2016 | Gerards | |
| 2016/0032794 A1* | 2/2016 | Fischer | F02D 9/04 251/305 |
| 2017/0241349 A1* | 8/2017 | Greber | F02D 9/106 |
| 2017/0284310 A1 | 10/2017 | Delplanque et al. | |
| 2018/0347706 A1* | 12/2018 | Ishikawa | F16K 1/2078 |
| 2019/0323611 A1* | 10/2019 | Botella | F01N 1/165 |
| 2019/0323612 A1* | 10/2019 | Botella | F02M 26/66 |
| 2019/0390581 A1* | 12/2019 | Mercier | F02D 9/106 |
| 2020/0003333 A1* | 1/2020 | Delplanque | F02M 26/70 |
| 2020/0116262 A1* | 4/2020 | De Matos et al. | |

FOREIGN PATENT DOCUMENTS

| | | | |
|---|---|---|---|
| DE | 102016107265 A1 | | 10/2017 |
| DE | 102019114306 | * | 12/2019 |
| DE | 102019114306 A1 | | 12/2019 |
| EP | 0835998 | * | 4/1998 |
| EP | 0835998 A1 | | 4/1998 |
| KR | 20170038916 A1 | | 4/2017 |
| WO | 2006003017 A1 | | 1/2006 |
| WO | WO 2006003017 | * | 1/2006 |
| WO | 2010103249 A1 | | 9/2010 |
| WO | WO 2010103249 | * | 9/2010 |
| WO | 2019238490 A1 | | 12/2019 |
| WO | WO 2019238490 | * | 12/2019 |

\* cited by examiner

VALVE FOR EXHAUST LINE

CROSS-REFERENCE TO RELATED APPLICATIONS

This application is a U.S. non-provisional application claiming the benefit of French Patent Application No. 18 53586, filed on Apr. 24, 2018, which is incorporated herein by its entirety.

FIELD OF INVENTION

The invention generally concerns valves for exhaust lines that are controlled by actuators.

BACKGROUND OF THE INVENTION

Such valves are currently installed in the exhaust systems of high-end vehicles. Auto-manufacturers make little or no use of them in exhaust line systems for entry-level vehicles because of their cost.

In the near future, it is likely that the standards for noise emission levels for exhaust line systems will be made more stringent. This could force auto manufacturers to integrate pilot operated valves, even in entry-level vehicles.

SUMMARY OF THE INVENTION

In this context, the invention aims to provide a valve for an exhaust line which involves moderate costs.

To this end, the invention concerns according to a first aspect a valve for an exhaust line, comprising:
- a valve body delimiting a passage for the exhaust gases;
- a flap arranged in the valve body;
- a drive shaft configured to drive the flap and being integrally secured to the flap;
- at least one guide bearing configured to guide the drive shaft of the flap in rotation in relation to the valve body and being connected to the valve body;
- an actuator;
- a transmission comprising an adapter rigidly attached directly to the drive shaft of the flap, the transmission being arranged in order to transmit an engine torque between the actuator and the adapter; and
- the adapter having a contact surface that is in sealed contact with a complementary surface provided on the guide bearing.

In addition, the valve may have one or more of the following characteristic features, considered individually or in accordance with any technically possible combination:
- the contact surface is spherical, with the complementary surface being conical;
- the adapter is rigidly attached to one end of the drive shaft for the flap;
- the adapter is a plate;
- the adapter includes a convex central zone defining the contact surface and having an orifice through which the drive shaft passes;
- the adapter includes a skirt that is integrally secured to the central zone and surrounding the guide bearing;
- the transmission comprises a driving member that is driven in rotation by the actuator and a resilient member that couples the adapter and the driving member in rotation;
- the resilient member biases the contact surface of the adapter against the complementary surface of the guide bearing;
- the guide bearing comprises a mesh of metal wires and/or comprises a material selected from graphite and ceramic, or any combination of such material or materials with a mesh of metal wires; and
- the valve has a tubular casing in which the guide bearing is housed, the tubular casing being engaged through an orifice in the valve body and rigidly attached to the valve body.

According to a second aspect the invention concerns an exhaust line equipped with a valve having the above characteristic features.

BRIEF DESCRIPTION OF THE DRAWINGS

Other characteristic features and advantages of the invention will emerge from the detailed description given below, merely by way of indication and without limitation, with reference to the annexed figures, among which.

DETAILED DESCRIPTION

Figure 1:
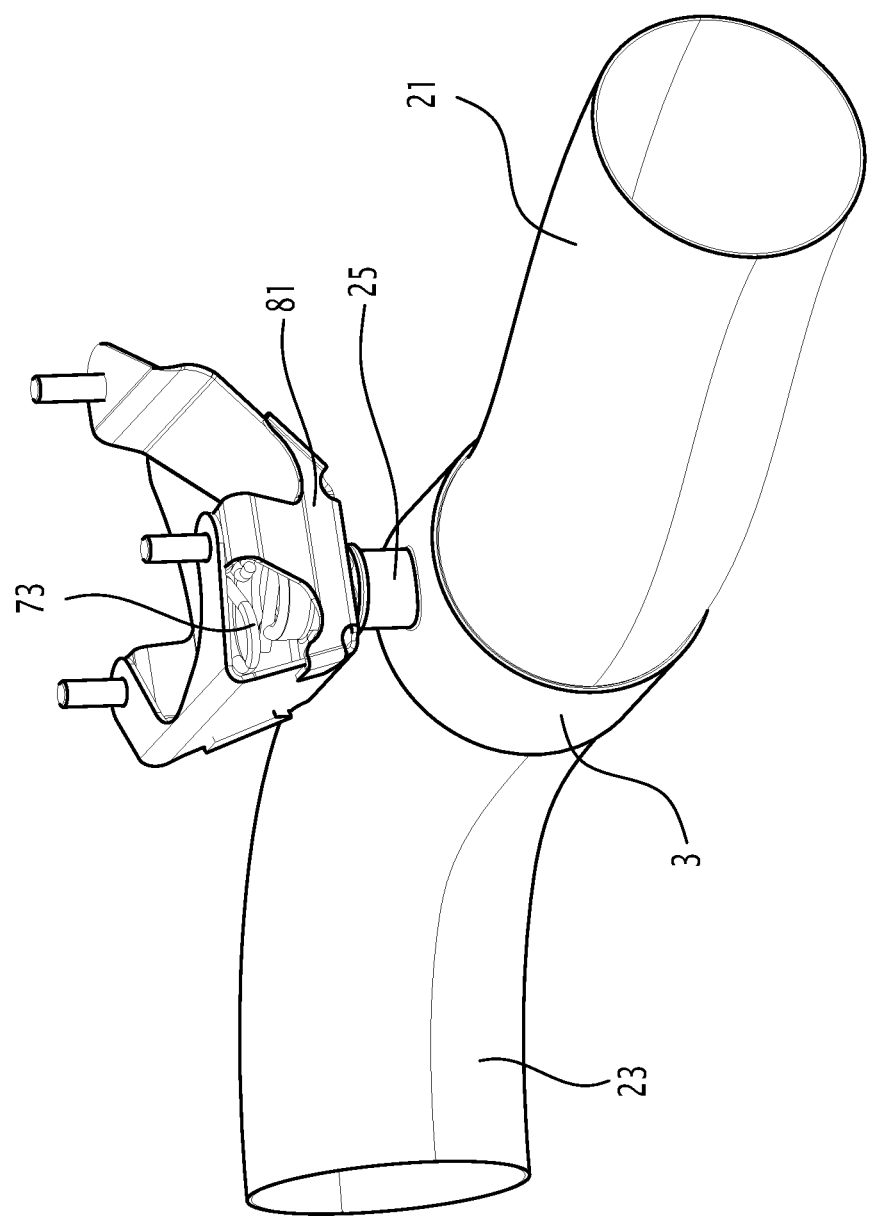
FIG. 1 is a perspective view of a part of an exhaust line equipped with a valve of the invention, and an actuator not being represented.
Figure 2:
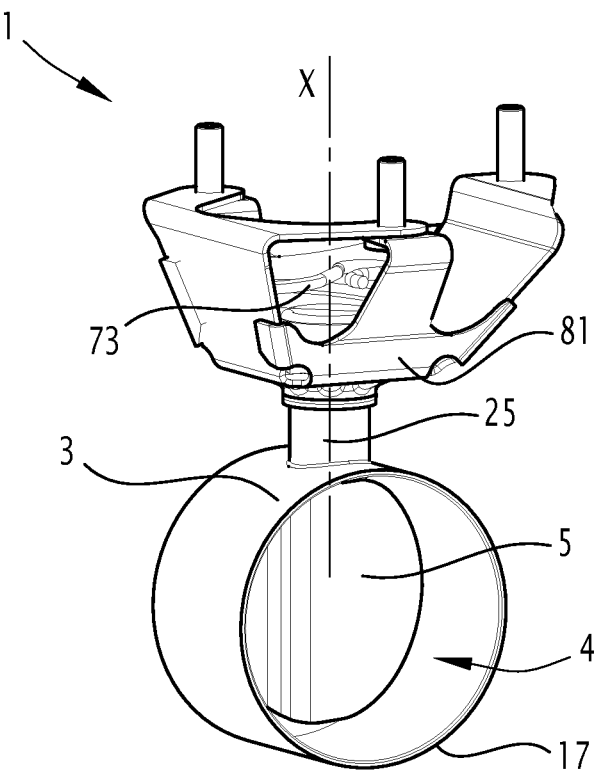
FIG. 2 is a perspective view of the valve shown in FIG. 1, without the inlet and outlet ducts.
Figure 3:
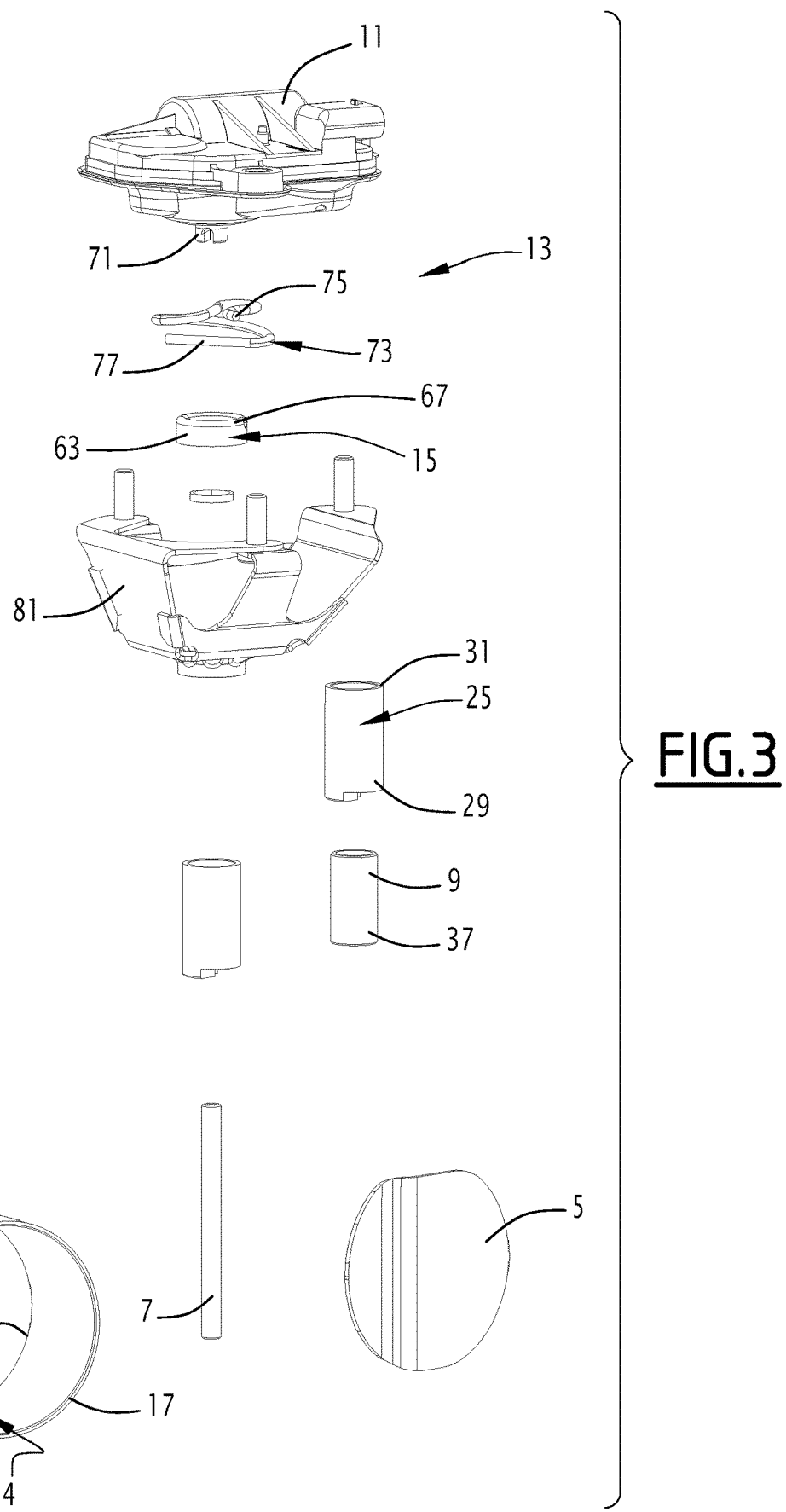
FIG. 3 is a perspective, exploded view of the valve in FIGS. 1 and 2, without the inlet and outlet ducts but with the actuator.

The valve 1 shown in FIGS. 1 to 3 is intended for installation on an exhaust line of a vehicle. This vehicle is typically an internal combustion engine vehicle, such as a car or truck.

The valve 1 is provided, for example, in order to vary the cross-section of the passage for exhaust gas flow in a component member of the exhaust line, such as a tube or silencer, so as to modulate the amount of recirculated exhaust gas at the intake of the internal combustion engine (EGR, Exhaust Gas Recycling), or to divert all or part of the exhaust gas flow to a heat exchanger or to a bypass duct for an exhaust gas purification member such as a $NO_X$ trap or an SCR (Selective Catalytic Reduction) catalyst.

The valve 1 comprises a valve body 3 defining a passage 4 for exhaust gases, a flap 5 arranged in the valve body 3, and a drive shaft 7 for driving the flap 5, the drive shaft 7 being integrally secured to the flap 5.

The valve 1 indeed also comprises at least one guide bearing 9 for guiding the drive shaft 7 of the flap 5 in rotation in relation to the valve body 3, an actuator 11, and a transmission 13.

The transmission 13 includes an adapter 15 rigidly attached directly to the drive shaft 7, the transmission 13 being arranged in order to transmit an engine torque between the actuator 11 and the adapter 15.

The valve body 3 has an exhaust gas inlet 17 and an exhaust gas outlet 19, with the passage 4 extending from the exhaust gas inlet 17 to the exhaust gas outlet 19.

Typically, as shown in FIG. 1, an inlet duct 21 is fluidly connected to the exhaust gas inlet 17, and an outlet duct 23 is fluidly connected to the exhaust gas outlet 19.

In the example shown, one end of the inlet duct 21 is engaged in the exhaust gas inlet 17, and one end of the outlet duct 23 is engaged in the exhaust gas outlet 19.

The inlet duct 21 communicates fluidly with the exhaust manifold that collects the exhaust gases exiting from the engine's combustion chambers. Other component members, such as the purification members for purifying exhaust gases, a turbocharger or any other suitable component member, are generally interposed between the exhaust manifold and the inlet duct 21.

The outlet duct 23 communicates fluidly with a cannula through which the purified exhaust gases are released into the atmosphere. Other component members, such as silencers or exhaust gas purification members, are generally interposed between the outlet duct 23 and the cannula.

Advantageously, the valve body 3 is a tube, typically of circular cross-section.

The tube is typically rectilinear (straight), in the sense that it has a rectilinear (straight) central line.

The drive shaft 7 is, for example, a section of metal tube with a small cross-section. The flap 5 is, for example, a pressed metal plate. The flap 5 is, for example, circular or oval. The drive shaft 7 is integrally secured to the flap 5. The drive shaft 7 is rigidly attached to the flap 5 by any method, for example by spot welding. In the example shown, the valve 1 is of the butterfly type, with the drive shaft 7 extending along a center line of the flap 5.

The actuator 11 and the transmission 13 are provided to move the flap 5 between a closed-off position for closing the passage 4, shown in FIG. 2, and at least one position in which the flap 5 lets open the passage 4. In this description, the terms axial and radial are to be understood in relation to the axis of rotation X of the flap 5.

In addition, the valve 1 has a tubular casing 25 in which the guide bearing 9 is housed. The tubular casing 25 is cylindrical, and its central axis is coincident with the axis of rotation X of the flap 5.

The tubular casing 25 is engaged through an orifice 27 of the valve body 3, and is rigidly attached to the valve body 3. For example, the tubular casing 25 is welded in a sealing manner to an edge of the orifice 27. The tubular casing 25 has an internal end 29 located within an interior of the valve body 3, and an external end 31 located on an exterior of the valve body 3. The tubular casing 25 is hollow.

The tubular casing 25 has a cylindrical wall 32, which is coaxial with the axis of rotation X of the flap 5, and is closed by a bottom 33 at the internal end 29. The bottom 33 has a central hole 35 drilled through it for the passage therethrough of the drive shaft 7.

The tubular casing 25, at its external end 31, is fully open.

Figure 5:
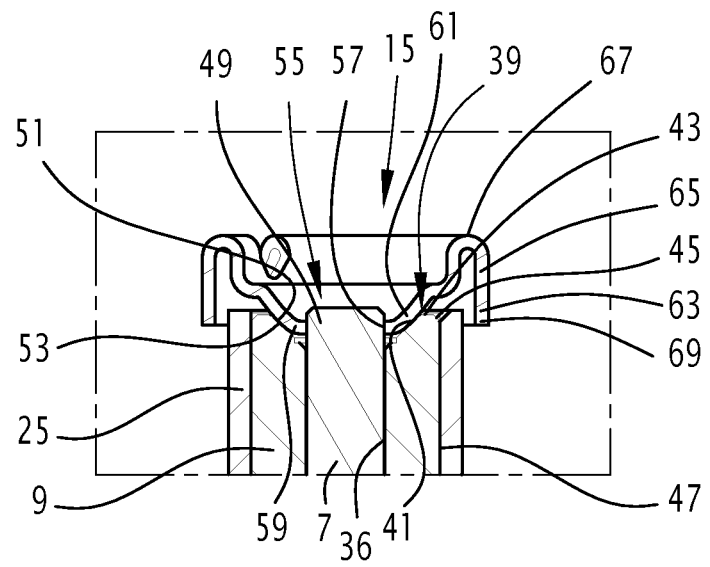
FIG. 5 is an enlarged view of an area shown in FIG. 4, showing the contact between a contact surface of the adapter and a complementary surface of the guide bearing.

The guide bearing 9 is in the form of a hollow cylinder. As shown in FIG. 5, the guide bearing 9 has a central passage 36, which is coaxial with the axis of rotation X of the flap 5, and is axially aligned with the central hole 35. The central passage 36 receives the drive shaft 7 internally.

The guide bearing 9 is housed within the interior of the tubular casing 25 and fills substantially the entire internal volume of the tubular casing 25, between the drive shaft 7 and the cylindrical wall 32 of the tubular casing 25.

The guide bearing 9 has a lower end 37 supported on the bottom 33. The upper end of the guide bearing 9 is delimited by a free surface 39. The free surface 39 is turned axially away from the valve body 3.

The central passage 36 opens into the center of the free surface 39.

The free surface 39 has, from the central passage 36, a first frustoconical surface 41, which extends from the passage 36 radially towards the exterior and axially in a direction opposite to the valve body 3. The first frustoconical surface 41 is extended radially towards the exterior via an annular surface 43, substantially perpendicular to the axis of rotation X of the flap 5. The annular surface 43 continues with a second frustoconical surface 45, extending from the annular surface 43 radially towards the exterior and axially towards the valve body 3. The frustoconical surface 45 connects with a radially external surface 47 of the guide bearing 9, which is supported against the cylindrical wall 32 of the tubular casing 25.

The adapter 15 is rigidly attached directly to one end 49 of the drive shaft 7 which protrudes from the guide bearing 9.

Figure 4:
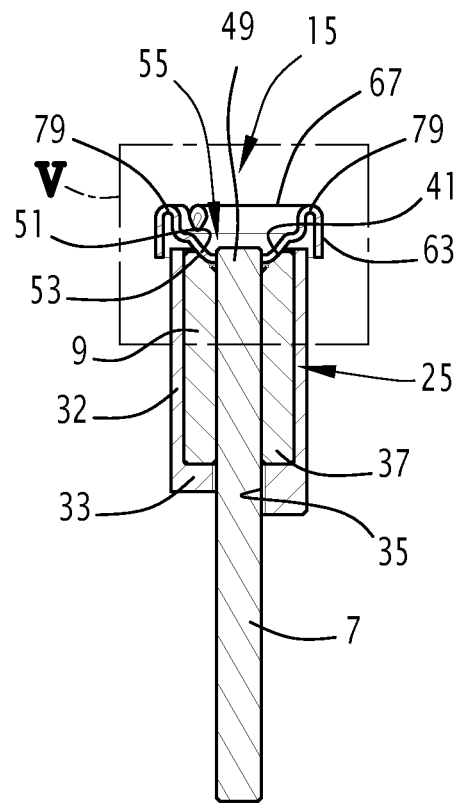
FIG. 4 is an axial cross-sectional view of a guide bearing and an adapter of the valve shown in FIGS. 1 to 3.

According to the invention, the adapter 15 has a contact surface 51 that is in sealed contact with a complementary surface 53 provided on the guide bearing 9 (FIGS. 4 and 5). This contact ensures a sealing against the exhaust gases that would rise upwards from the passage 4 along the drive shaft 7.

Advantageously, the contact surface 51 is spherical, and the complementary surface 53 is frustoconical. The contact between the contact surface 51 and the complementary surface 53 is linear.

More precisely, the contact surface 51 has, in the radial planes from the axis of rotation X of the flap 5, circular arc shaped sections.

The complementary surface 53 is typically a part of the first conical surface 41.

The guide bearing 9 comprises a metal wire mesh and/or includes a material selected from graphite and ceramic, or any combination of the said one or more materials with a metal wire mesh.

For example, it is made entirely of a wire mesh, or entirely of graphite or ceramic, or indeed it could even include both a wire mesh and graphite and/or ceramic.

The adapter 15 is typically a plate. This plate is shaped according to all the appropriate processes. For example, the plate is stamped.

By way of a variant, the adapter 15 is a sintered or machined part.

The adapter 15 has a convex central zone 55 defining the contact surface 51. The central zone 55 is convex towards the guide bearing 9.

The central zone 55 has an orifice 57, in which the drive shaft 7 is engaged. And the drive shaft 7, and more precisely the end 49 of the drive shaft 7, is typically welded in a sealed manner to the edge of orifice 57.

For example, the central zone 55 has a planar central portion 59, that is perpendicular to the axis of rotation X of the flap 5, in which the orifice 57 is provided. The central portion 59 extends radially towards the exterior by way of an annular portion 61 surrounding the central portion 59. This annular portion 61, considered in cross-section in radial planes in relation to the axis of rotation X of the flap 5, has a circular arc shape, and defines the contact surface 51.

The adapter 15 also includes a skirt 63 that is integrally secured to the central zone 55 and surrounding the guide bearing 9. The skirt 63 has a cylindrical shaped form, that is coaxial with the axis of rotation X of the flap 5. It has an upper edge 65 connected to the central zone 55 by an intermediate part 67. Considered in cross-section in radial planes from the axis of rotation X of the flap 5, the intermediate part 67 forms a turned-over section, i. e. a U whose central arched segment is turned axially in a direction opposite to the valve body 3. The skirt 63 also has a lower edge 69, opposite to the upper edge 65. This lower edge 69 is free.

The transmission 13 comprises a driving member 71 that is driven in rotation by the actuator 11 and a resilient member 73 that couples the adapter 15 and the driving member 71 in rotation.

The actuator 11 is, for example, a geared motor. The driving member 71 in this case is, for example, an end of an output shaft of the actuator 11.

The driving member 71 is rotatably coupled to the adapter 15 only by the resilient member 73.

This is, for example, a spring made of a curved metal wire.

For example, one end 75 of the resilient member 73 is engaged in a notch, not shown, provided in the driving member 71. An opposite end 77 of the resilient member 73 is engaged in notches 79 provided in the adapter 15. These notches were only shown in FIGS. 4 and 5.

The notches 79 are cut in the intermediate part 67, typically in two zones of the intermediate part 67 that are diametrically across from each other in relation to the axis of rotation X of the flap 5.

The resilient member 73 is conformed in order to axially bias the contact surface 51 against the complementary surface 53 of the guide bearing 9.

The actuator 11 is rigidly attached to a support bracket 81, which itself is rigidly attached to the tubular casing 25. The actuator 11 is thereby maintained in a position where the output shaft of the actuator 11 is aligned with the drive shaft 7.

The operation of the valve 1 will now be described.

The flap 5 is moved between its various different positions by activating the actuator 11. The torque generated at the level of the driving member 71 is transmitted by the resilient member 73 to the adapter 15. This latter is rigidly attached to the drive shaft 7, in a manner so that the torque is transmitted to the drive shaft 7 and to the flap 5. The resilient member 73 also biases the adapter 15 axially towards the valve body 3. This allows a biasing stress to be applied by pressing the contact surface 51 against the complementary surface 53.

Thus, a high degree of sealing is effectively obtained, preventing the exhaust gases flowing up the drive shaft 7 from escaping by passing through the guide bearing 9 and the adapter 15.

The valve 1 described here above has many advantages.

Since the seal against exhaust gases is achieved by a sealed contact between the contact surface 51 of the adapter 15 and a complementary surface 53 of the guide bearing 9, it is not necessary to provide for additional component members that are specially designed to achieve this sealing. The structure of the valve 1 is simplified and its cost is thus reduced.

The provision of a spherical contact surface 51 and a complementary conical surface 53 obtains an excellent sealing, even if the adapter 15 is slightly offset from the axis in relation to the guide bearing 9.

The attaching of the adapter 15 directly to one end of the drive shaft 7 makes possible a simple and economical construction of the valve 1 according to the invention.

The fact that the adapter 15 is made in the form of a plate also provides the ability to reduce manufacturing costs, as the adapter 15 can be manufactured by stamping, in a simple and economical way.

The provision of a convex central zone 55 on the adapter 15 makes it possible to create the contact surface 51 in a simple manner.

The skirt 63 of the adapter 15 protects the guide bearing 9 from external projections that can occur when the motor vehicle is moving.

The fact that the spring makes it possible both to transmit the torque between the driving member 71 and the adapter 15 and to press the contact surface 51 tightly against the complementary surface 53 provides the ability to obtain in a very economical manner an excellent sealing.

The material of the guide bearing 9 is indeed well suited for obtaining a sealed contact.

The fact of fabricating the guide bearing 9 in the form of a member inserted in a tubular casing 25, which is itself engaged through an orifice 27 of the valve body 3, also contributes to reducing the manufacturing cost of the valve.

The valve 1 can have multiple variants.

The contact surface 51 could be conical and the complementary surface 53 spherical. Alternatively, the contact between the contact surface 51 and the complementary surface 53 is not a linear contact but is brought about over a two-dimensional surface. For example, the contact surface 51 and the complementary surface 53 are both frustoconical and have the same shape.

The adapter 15 may have a different shape from the one described above. For example, the adapter 15 is a lever with one end attached to the drive shaft 7. This is an end which defines the contact surface 51 that ensures sealed contact with the guide bearing 9. The lever is moved by the actuator.

In another variant, the guide bearing 9 and the tubular casing 25 are not two parts separated from each other, but only one solid part, for example made of stainless steel.

In the example of the embodiment described above, the valve 1 has a single, long-length bearing that is mounted at the end of the drive shaft 7 rotatably coupled to the actuator 15. By way of a variant, the valve 1 additionally also has a second bearing, which guides the end of the drive shaft 7 opposite the adapter 15 in rotation.

According to another aspect, the invention concerns an exhaust line equipped with a valve 1 having the above characteristic features.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A valve for an exhaust line, the valve comprising
   a valve body delimiting a passage for the exhaust gases;
   a flap arranged in the valve body;
   a drive shaft configured to drive the flap and being integrally secured to the flap;
   at least one guide bearing configured to guide the drive shaft of the flap in rotation in relation to the valve body, wherein the at least one guide bearing is connected to the valve body;
   an actuator;
   a transmission comprising an adapter rigidly attached directly to the drive shaft of the flap, the transmission being arranged to transmit a motor torque between the actuator and the adapter; and
   the adapter having a contact surface that is in sealed contact directly with a complementary surface of the at least one guide bearing provided on the at least one guide bearing.

2. A valve according to claim 1, in which the contact surface is spherical, with the complementary surface being conical.

3. A valve according to claim 1, in which the adapter is rigidly attached to one end of the drive shaft for the flap.

4. A valve according to claim 1, in which the adapter is a plate, the contact surface that is in sealed contact directly with the complementary surface provided on the at least one guide bearing being a surface of the plate.

5. A valve according to claim 4, in which the adapter includes a convex central zone defining the contact surface and having an orifice through which the drive shaft passes, the convex central zone being the surface of the plate.

6. A valve according to claim 5, in which the adapter includes a skirt that is integrally secured to the convex central zone and surrounds the at least one guide bearing.

7. A valve according to claim 5, wherein the adapter includes a skirt that is integrally secured to the convex central zone, and wherein the skirt has an upper edge connected to the convex central zone by an intermediate part forming a U-shaped section having a central arched segment that is turned axially in a direction opposite to the valve body, and the skirt extending from the intermediate part to a free lower edge opposite to the upper edge.

8. A valve according to claim 7, wherein the transmission comprises a driving member that is driven in rotation by the actuator, and including a resilient member that couples the adapter and the driving member in rotation.

9. A valve according to claim 8, wherein the driving member is rotatably coupled to the adapter only by the resilient member.

10. A valve according to claim 8, wherein one end of the resilient member is engaged in the driving member and an opposite end of the resilient member is engaged in notches provided in the adapter.

11. A valve according to claim 10, wherein the notches are cut in the intermediate part of the skirt.

12. A valve according to claim 1, in which the transmission comprises a driving member that is driven in rotation by the actuator and a resilient member that couples the adapter and the driving member in rotation.

13. A valve according to claim 12, in which the resilient member biases the contact surface of the adapter against the complementary surface of the at least one guide bearing.

14. A valve according to claim 1, in which the guide bearing comprises a mesh of metal wires, or a material selected from graphite and ceramic, or a metal wire mesh combined with graphite and/or ceramic.

15. A valve according to claim 1, including a tubular casing in which the at least one guide bearing is housed, the tubular casing being engaged through an orifice in the valve body and rigidly attached to the valve body.

16. An exhaust line including a valve according to claim 1.

17. A valve according to claim 1, wherein the contact surface is made in a part of the at least one guide bearing that comprises a metal wire mesh or includes a material selected from graphite and ceramic or includes a metal wire mesh combined with graphite and/or ceramic.

18. A valve according to claim 1, wherein the contact surface is in sealed contact with the complementary surface provided on the at least one guide bearing without a sealing organ being interposed between the contact surface and the complementary surface.

* * * * *